Figure 2:
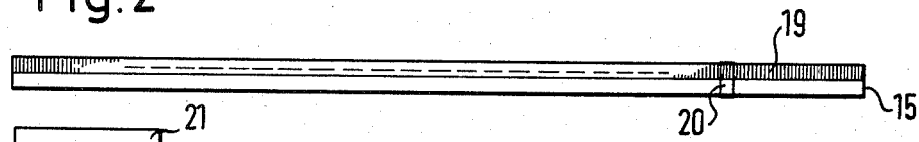

United States Patent [19]

Fetzer et al.

[11] 4,402,609

[45] Sep. 6, 1983

[54] LIGHT CURTAIN APPARATUS

[75] Inventors: Günter Fetzer, Gundelfingen; Horst Biehrer, Ettenheim, both of Fed. Rep. of Germany

[73] Assignee: Erwin Sick GmbH Optik-Elektronik, Fed. Rep. of Germany

[21] Appl. No.: 165,460

[22] Filed: Jul. 2, 1980

[30] Foreign Application Priority Data

Jul. 10, 1979 [DE] Fed. Rep. of Germany ....... 2927845

[51] Int. Cl.³ .................... G01S 17/06; G01B 11/04
[52] U.S. Cl. ............................ 356/387; 250/237 G; 250/571; 356/386; 356/431
[58] Field of Search ............... 356/386, 387, 429, 431; 250/237 G, 560, 563, 571

[56] References Cited

U.S. PATENT DOCUMENTS

| | | | |
|---|---|---|---|
| 3,708,681 | 1/1973 | Ivers | 250/237 G |
| 3,744,915 | 7/1973 | Sick | 356/386 |
| 3,829,220 | 8/1974 | Parkinson | 356/387 |
| 4,097,875 | 6/1978 | Scholten et al. | 250/237 G |
| 4,112,295 | 9/1978 | Dubik et al. | 250/237 G |

Primary Examiner—R. A. Rosenberger
Attorney, Agent, or Firm—Townsend & Townsend

[57] ABSTRACT

Light curtain apparatus incorporating a cyclical scale generator has a light transmitter 12 which projects a light beam onto an optical scanning device 13 located at the focal point of a strip-like concave mirror 14. As a result a parallel scanning light beam 20, which is continuously displaced parallel to itself, is produced in the image space of the concave mirror 14. The scanning light beam 20 is directed through a monitored region 17 towards a retro-reflector 16 and light returned from the retro-reflector 16 is passed via a beam divider 27 to a first light receiving device 18. In this way interruption of the light beam, for example by an object 31, results in interruption of the signal from the first photoelectric receiving device 18. A reflecting scale grid 19 is arranged to intercept a part of the scanning light beam 20 and light reflected from reflective bars of the scale grid 19 is projected, via the concave mirror 14, the optical scanning means 13 and a beam divider 29, onto a bar pattern 21 located in front of a second photoelectric receiving device 11. The divisions of the bar pattern 21 correspond in size with the divisions in the image of the reflecting scale grid 19 which are considerably finer than the cross-sectional dimension of the scanning light beam 20 and this results in the generation of a high frequency pulse signal at the second photoelectric receiver 11 which enables the position or size of the object 31 to be measured with a higher resolution than the cross-sectional dimension of the scanning light beam 20.

16 Claims, 6 Drawing Figures

LIGHT CURTAIN APPARATUS

The present invention relates to light curtain apparatus incorporating a cyclical scale generator.

Apparatus of this kind is known in which an optical scanning device located at the focal point of a strip-like concave mirror scans an incident laser light beam across the aperture of the mirror to produce a parallel scanning light beam which is continuously displaced parallel to itself through a region to be monitored in the image space of the concave mirror. This parallel scanning beam moves very fast and is thus likened to a curtain of light, hence the name light curtain. A reflecting device such as a retro-reflector is usually provided at the other end of the monitored region to reflect the parallel scanning light beam back to the concave mirror and, via the scanning device, to a photoelectric detector. This type of apparatus can be used for a number of purposes for example as a monitoring device, to detect intrusion into the region being monitored, and as a measuring device to measure the length, size or position of an object present, or moving through, the monitored region. It is particularly useful, in particular for the afore-mentioned types of measuring apparatus, to be able to generate a cyclical scale signal representative of the instantaneous position of the parallel scanning light beam at any given time and for this purpose light curtain apparatus has already been proposed which incorporates a reflecting scale grid extending along a light exit window in front of the concave mirror. A fraction of the parallel light beam from the concave mirror is reflected from the reflecting parts of the scale grid and directed to a photoelectric detector which produces a pulsed output signal as the fraction of the parallel scanning beam alternately strikes reflecting and non-reflecting bars of the scale grid.

In such known apparatus (cf. for example DE-PS No. 34 40 688) the scale generator serves to produce a continuous and sequentially numbered group of pulses during the scanning of the monitored region which makes it possible to specify the location of an obstacle within the monitored region by comparing the electrical signals of the two light receiving devices.

A problem which occurs with the known light curtain apparatus is however that the resolution limits are set by the width of the scanning light beam which has to be smaller in diameter than the divisions of the reflecting scale grid.

The principal object underlying the present invention is to provide light curtain apparatus of the kind generally described above in which a significantly finer resolution is possible than can presently be achieved even when using a laser light source which produces a scanning light beam of small diameter.

In order to accomplish this object the invention envisages, in a specific form, light curtain apparatus incorporating a cyclical scale generator, said apparatus comprising a transmitter part for generating a laser light beam, a light scanning device located substantially at the focal point of a strip-like concave mirror for scanning said laser light beam over said strip-like concave mirror to project a parallel light beam, which is continuously displaced parallel to itself and which defines said light curtain, through a light exit window and across a region to be monitored by the light curtain, a reflecting scale grid extending along the light exit window to intercept a part of said parallel light beam, a first photoelectric receiving device disposed at an end of said monitored region to receive light transmitted therethrough and converted into a first electrical monitoring signal, a second photoelectric receiving device for receiving light reflected from said scale grid, said scale grid having divisions which are so fine that said parallel light beam embraces a plurality of said divisions at any one time, there being further provided a bar pattern arranged in the light beam reflected from said reflecting scale grid with the divisions of said bar pattern being equal and parallel to the division produced in the returned light beam by the reflecting grid scale and said second receiving device including at least one photoelectric detector for detecting the light which periodically passes through the bar pattern to generate a cyclically varying scale signal.

The present invention also comprises in more generalized form light curtain apparatus incorporating a cyclical scale generator and comprising a transmitter part for generating a light beam, optical scanning means located substantially at the focal point of a concave mirror to scan said light beam across said concave mirror and produce, after reflection at said concave mirror, a parallel light beam which is continuously displaced parallel to itself through a region to be monitored and which defines said light curtain, a first photoelectric receiver arranged to detect light crossing said monitored region and produce a monitoring signal, a scale grid arranged to intercept a part of said light beam after said optical scanning means, said scale grid having a number of divisions with said divisions being sufficiently fine that said intercepted light beam always impinges on a plurality of said divisions, a second photoelectric receiver arranged to receive light emerging from said scale grid and passing through a bar pattern arranged between said scale grid and said second photoelectric receiver with the divisions of said bar pattern being equal and parallel to the divisions produced in the light received from the scale grid by the scale grid whereby to generate a cyclical scale signal.

As a result of the arrangements set out above a shaddow image consisting of a plurality of scale lines arranged alongside one another appears on the surface of the second photoelectric receiver which can take the form of one or more photoelectric detectors or a matrix of parallel connected photodiodes. The shaddow image moves transversely across the second photoelectric receiver in correspondence with the scanning speed of the parallel scanning beam. In the same way, and at the same time, a plurality of scale lines of the bar pattern are imaged on the surface of the photoelectric detector but however remain stationary. If the dark lines from the image of the scale grid lie directly between the impermeable bars of the bar pattern the second photoelectric receiving device receives practically no light. If, in contrast, the dark lines originating from the image of the scale grid cover the bars of the bar pattern, then the light reflected from the specularly reflecting gaps of the scale grid can pass fully between the bars of the bar pattern and reach the second photoelectric receiving device. In this position a maximum electrical output signal is achieved.

The frequency of the electrical scale signal at the output of the second photoelectric receiving device thus corresponds to the scanning speed with which the scanning light beam sweeps over the scale grid. It will thus be apparent that a relatively high frequency cyclical scale signal, which enables a high degree of resolution, is achieved when the scanning light beam has a relatively larger diameter than the finer division of the reflecting scale. It is particularly advantageous if the cross-section of the scanning light beam is arranged to equal from 2 to 8 and preferably around 5 divisions of the reflecting scale.

The image of the reflecting scale grid at the location of the bar pattern is usefully arranged to extend on all sides beyond the bar pattern.

In accordance with one embodiment the reflecting scale grid only extends over a portion of the light exit window. The cross-section of the scanning light beam is thus divided between the reflecting scale and the region to be monitored.

It is however also possible for a part of the scanning light beam to be reflected from the path of the scanning light beam and passed to the scale grid via a strip-like beam divider arranged in front of the light exit window. In this embodiment the scanning light beam maintains its full cross-section in the region to be monitored and is only weakened by the light fraction reflected at the beam divider.

In the last mentioned embodiment it is useful if the reflecting scale grid is so tilted about its axis that the specularly reflected light beam is geometrically separated from the scanning light beam so that, after deflection at the scanning device, it can be simply deflected by a plane mirror onto the bar pattern. The transmitted light beam thus does not fall exactly at normal incidence on the reflecting scale but at an angle which deviates slightly from 90° so that the light beam specularly reflected from the scale grid takes a slightly different path over the concave mirror and the scanning device than the scanning light beam. The geometrical separation of the transmitted and received light beams which is achieved in this way is used to reflect the light beam for the cyclical scale generator out of the path of the operational light beam.

Figure 3:
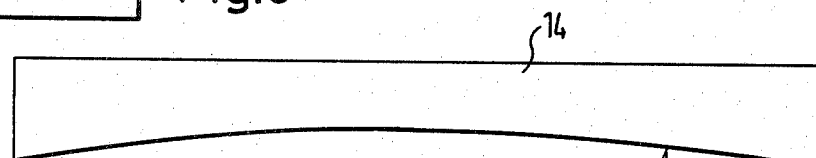
Figure 1:
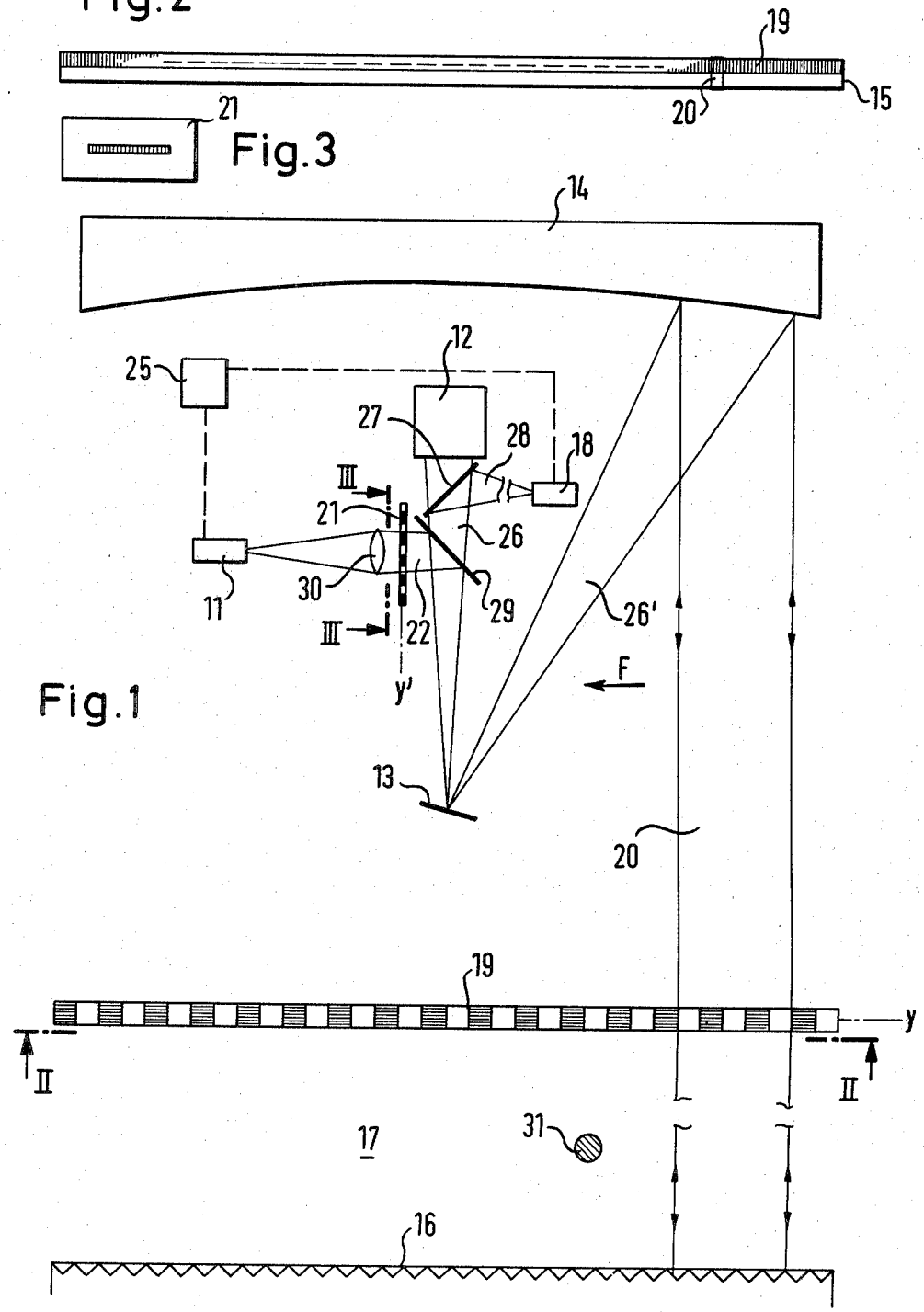
Figure 1A:
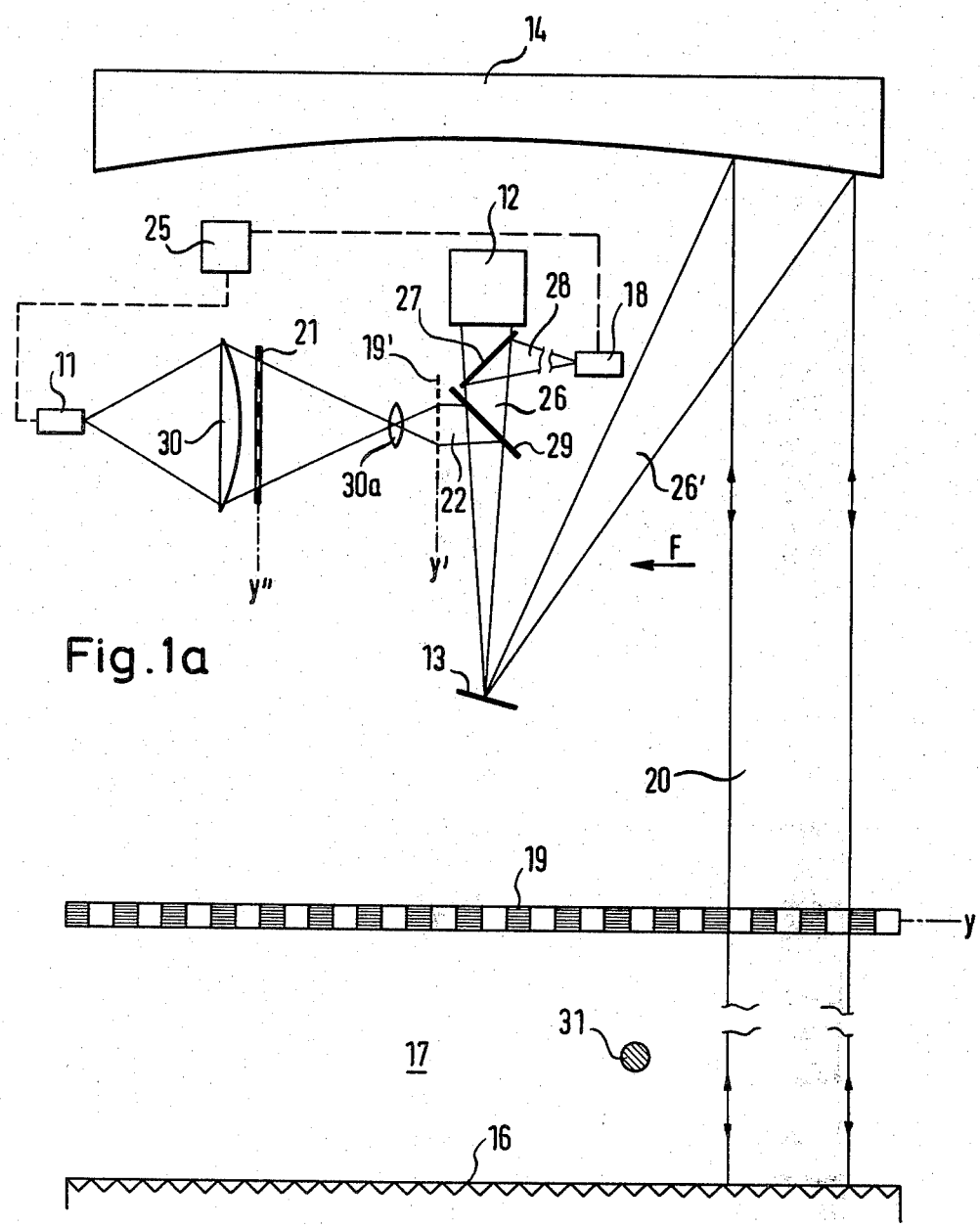
Figure 4:
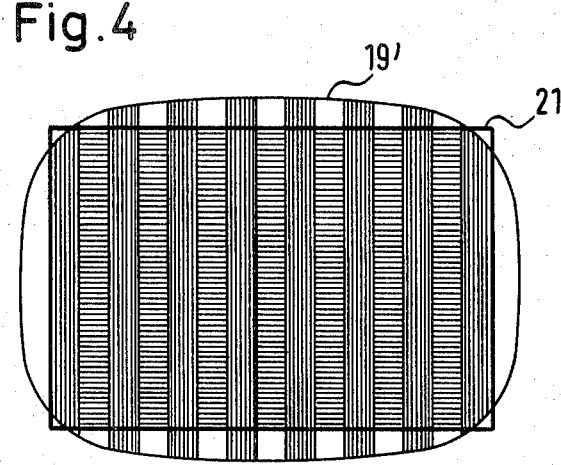
Figure 5:
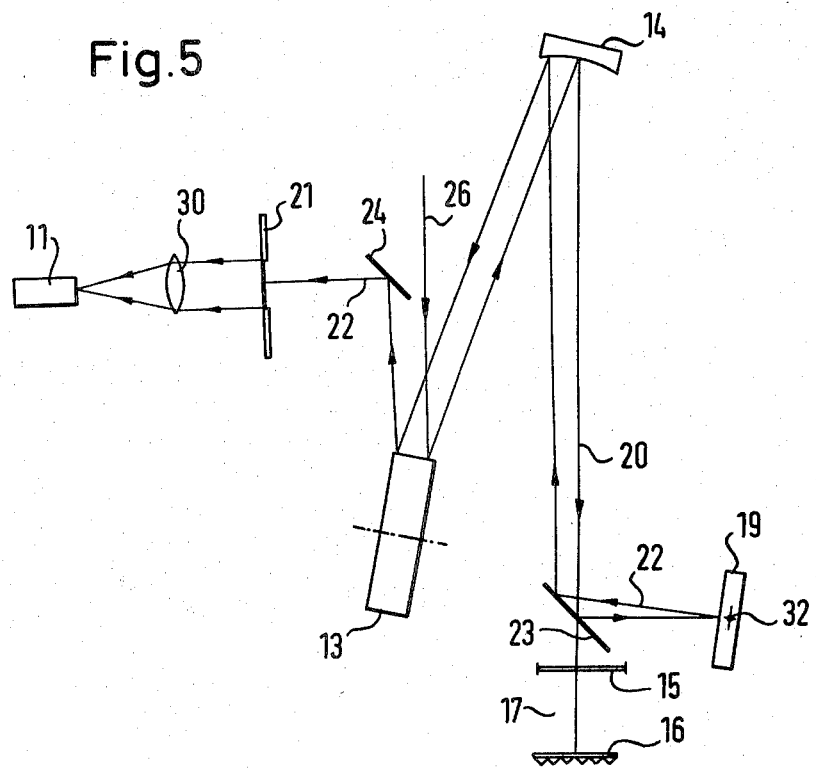

The invention will now be described, by way of example only, in more detail with reference to the accompanying drawings in which are shown:

FIG. 1 a schematic plan view of light curtain apparatus in accordance with the invention, FIG. 1a a somewhat modified embodiment, FIG. 2 a view on the line II—II of FIG. 1, FIG. 3 a view on the line III—III of FIG. 1, FIG. 4 a plan view of a bar pattern suitable for use in the apparatus of FIGS. 1 to 3 and showing a superimposed image of a reflecting scale grid, FIG. 5 a side view of a similar embodiment to that of FIG. 1 but showing an alternative arrangement of a cyclical scale generator.

In accordance with FIG. 1 a transmitter part 12, equipped with a laser and lenses, generates a converging laser light beam 26 which is focussed onto the surface of a rotating mirror wheel scanning device 13 which is located at the focal point of a strip-like concave mirror 14. As a result of this arrangement a divergent light beam 26' is reflected from the mirror wheel 13 onto the concave mirror 14 and is projected from this mirror as a parallel scanning light beam 20 through a region to be monitored 17. The parallel scanning light beam 20 is continuously displaced parallel to itself, in the direction of the arrow F, to and fro across the aperture of the concave mirror as a result of rotation of the mirror wheel 13.

The parallel scanning light beam 20 emerges, as can be seen from FIGS. 1 and 2, through a strip-like light exit window 15 one half of which has a reflecting scale grid 19 in the manner which can be seen from FIG. 2. The grid lines of the reflecting scale grid 19 are black and reflect no light. Between the grid lines there are located specularly reflecting regions. For the purposes of illustration the grid lines and also the parallel scanning light beam 20 are shown to an enlarged exaggerated scale in FIG. 1. The plane of the reflecting scale grid is designated by the reference letter y and its image plane with y'.

The arrangement of FIG. 2 is so laid out that one half of the rectangular slot-like cross-section of the transmitted light beam 20 impinges on the reflecting scale grid while the other half emerges through the window 15 and passes through the region to be monitored 17 to a strip-like retro-reflector 16 arranged at the end of the monitored region. This retro-reflector 16 reflects the scanning light beam back on itself so that it once more enters the window 15 and is reflected via the concave mirror 14 and the mirror wheel 13 to a beam divider 27 which passes the operational light beam 26, which contains the desired signal information, to a first light receiving device 18. The first light receiving device delivers an electrical signal at its output which has a strength corresponding to the intensity of the light returned through the monitoring region 17.

The fraction of the transmitted light beam 20 reflected from the reflecting scale grid 19 is reflected out of the beam path for the monitoring signal by a beam divider 29 arranged in front of the mirror wheel 13. In accordance with the invention a bar pattern 21 which is reproduced in plan view in FIG. 3, is located in the path of the light beam from the scale grid which is reflected in the afore-mentioned manner from the beam divider 29. The division of this bar pattern corresponds to the division of the shaddow image which the reflecting scale grid 19 develops in the plane of the bars of the bar pattern 21. The bars of the bar pattern 21 and the lines of the shaddow image are also parallel to one another.

A lens 30 concentrates the light passing through the bar pattern 21 onto a photodetector 11.

FIG. 4 shows in an enlarged form a plan view of the bar pattern 21 on which the shaddow image 19' of the reflecting scale grid 19 appears, and indeed preferably in enlarged form. When the dark lines of the shaddow image 19' lie exactly between the impermeable bars of the bar pattern 21 practically no light reaches the light receiving surface of the photoelectric detector 11 so that this light receiving surface is completely dark. If, in contrast, the dark lines of the shaddow image 19 are aligned with the light impermeable bars of the bar pattern, then light from the reflecting scale grid can pass fully through the light permeable bars of the bar pattern 21 and the photoelectric detector 11 delivers a maximum output signal. Clearly the output signal from the photoelectric detector 11 will be a pulse signal as light alternately falls on and is obscured from the photoelectric detector 11.

The electrical output signals of the first receiving device 18 and the second receiving device constituted by the photoelectric detector 11 are passed to an electronic processing circuit 25 as is illustrated by broken lines in FIG. 1. The electrical signal received from the first light receiving device 18 is related to the cyclical scale signal in the electronic processing circuit 25. In this manner it is possible to accurately specify the location and the extent of an object or obstacle 31 present in the region monitored by the light curtain in accordance with the division of the reflecting scale grid 19.

FIG. 5 shows a side view of a similar embodiment to that of FIG. 1. A strip-like beam divider 23 which extends in the longitudinal direction at right angles to the plane of the drawing is arranged in the parallel scanning light beam 20 just in front of the light exit window 15. This strip-like beam divider allows a fraction of the scanning light beam 20 to pass through to the monitored region 17 and reflects the remaining fraction to the reflecting scale grid 19 which is arranged substantially at right angles to the light exit window 15. As can be seen from FIG. 5 the strip-like reflecting scale grid 19 is tilted somewhat about its longitudinal axis 32 so that the branched-off fraction of the light beam 20 impinges on the surface of the reflecting scale grid 19 not exactly at right angles but rather at an angle which deviates slightly from 90°. As a result the light beam 22 reflected from the reflecting scale grid no longer coincides with the transmitted light beam 20 and passes via the concave mirror 14 and the mirror wheel 13 to a plane mirror 24 arranged alongside the laser light beam 26. The mirror 24 deflects the light beam 22 in the above described manner to the bar pattern 21. Thus a small degree of tilting of the reflecting scale grid 19 enables a geometrical beam division to be realized.

The embodiment of FIG. 1a corresponds extensively with the embodiment of FIG. 1 with the exception that the bar pattern 21 is not arranged at the location of the shaddow image 19' of the reflecting scale grid 19. The shaddow image 19' is moreover firstly imaged in enlarged form by a lens 30a in a plane y''. A correspondingly enlarged bar pattern 21 is arranged in the plane y''. Thus in this embodiment the bar pattern does not need to be particularly fine. A further lens 30 concentrates the light emerging through the bar pattern 21 onto the photoelectric detector 11 in the same manner as previously described.

It will be appreciated by those skilled in the art that a great many modifications can be made to the presently described arrangement without departing from the scope of the present claims. For example the single photoelectric detector 11 can readily be replaced by a plurality of interconnected photoelectric detectors or indeed by a whole matrix array of parallel connected photodiodes. Furthermore it is not essential that the light scanning device be a mirror wheel, one of the other known arrangements could readily be used. The reflecting scale grid could also be replaced by a scale grid which operates in transmission and the scale grid could conceivably be positioned at other locations than the preferred location at or adjacent to the light exit window. It will be appreciated that if any optical magnification takes place of the light returned to the bar pattern from the scale grid, the scale grid will need to be correspondingly enlarged so that the divisions of the bar pattern are the same size as the divisions in the image of the scale grid at the bar pattern.

We claim:

1. Light curtain apparatus incorporating a cyclical scale generator for establishing at least one of the position and size of an object present within a monitored region having first and second ends, the apparatus comprising means for generating a laser light beam, a strip-like concave mirror and the monitored region, a light scanning device located substantially at said focal point for scanning said laser light beam over said strip-like concave mirror whereby to project a parallel light beam which is continuously displaced parallel to itself to form the light curtain through said light exit window across said monitored region, a reflecting stationary scale grid extending along the light exit window to intercept a part of said parallel light beam, a first photoelectric receiving device disposed at one of said first and second ends of said monitored region to receive light transmitted therethrough and convert it into a first electrical monitoring signal, a second photoelectric receiving device for receiving a returned light beam reflected from said reflecting stationary scale grid, said reflecting stationary scale grid having divisions which are so fine that said parallel light beam embraces a plurality of said divisions at any one time, a stationary bar pattern having a plurality of divisions arranged in the returned light beam reflected from said reflecting stationary scale grid at a position occupied by a shadow image of said reflecting stationary scale grid, the divisions of said stationary bar pattern being equal in size and parallel to divisions produced in said shadow image at the stationary bar pattern by the reflecting stationary scale grid, and means for focusing said stationary bar pattern onto said second receiving device, said second receiving device including at least one photoelectric detector for detecting light which periodically passes through the stationary bar pattern to generate a cyclically varying scale signal.

2. Light curtain apparatus in accordance with claim 1 and wherein said light scanning device comprises a rotatable mirror wheel.

3. Light curtain apparatus in accordance with claim 1 and wherein said reflecting scale grid is specularly reflecting.

4. Light curtain apparatus in accordance with claim 1 and further comprising a retro-reflector provided at one end of said monitored region for reflecting said parallel light beam to said first photoelectric receiving device.

5. Light curtain apparatus in accordance with claim 4 and wherein the light beam returned from said retro-reflector reaches said first photoelectric receiving device via said concave mirror and said scanning means.

6. Light curtain generating apparatus in accordance with claim 1 and wherein said second photoelectric receiving device receives light from said reflecting scale grid via said scanning means.

7. Light curtain apparatus in accordance with claim 6 and wherein the returned light beam reflected from said reflecting scale grid is branched off to said second photoelectric receiving device after further reflection at said light scanning device.

8. Light curtain apparatus in accordance with claim 1 and wherein a lens is provided to concentrate the returned light beam from said reflecting scale grid onto said second photoelectric receiving device.

9. Light curtain apparatus in accordance with claim 1 and wherein said shadow image has an area which is larger than that of said bar pattern.

10. Light curtain apparatus in accordance with claim 1 and wherein said reflecting scale grid extends over a part of said light exit window.

11. Light curtain apparatus in accordance with claim 1 and wherein a part of said parallel light beam is reflected from the path of said parallel light beam by a strip-like beam divider and is passed to said reflecting scale grid.

12. Light curtain apparatus in accordance with claim 11 and wherein said reflecting scale grid is so tilted about its longitudinal axis that the specularly reflected light beam is geometrically separated from said parallel light beam.

13. Light curtain apparatus incorporating a cyclical scale generator for establishing at least one of the position and size of an object present within a monitored region, the apparatus comprising means for generating a light beam, a strip-like concave mirror having a focal point, optical scanning means located substantially at said focal point to scan said light beam across said strip-like concave mirror and produce, after reflection at said strip-like concave mirror a parallel light beam which is continuously displaced parallel to itself and projected across said monitored region to form said light curtain, a first photoelectric receiver arranged to detect light from said parallel light beam crossing said monitored region and produce a monitoring signal, a stationary scale grid arranged to intercept a part of said light beam after said optical scanning means, said stationary scale grid having a number of divisions with said divisions being sufficiently fine that said intercepted light beam always impinges on a plurality of said divisions, a stationary bar pattern also having a number of divisions positioned at the location of a shadow image of said stationary scale grid to receive light from said stationary scale grid, with the divisions of said stationary bar pattern being equal in size and parallel to divisions produced in said shadow image at the stationary bar pattern by the stationary scale grid, and a second photoelectric receiver for detecting light resulting from superposition of said shadow image on said stationary bar pattern whereby to produce a cyclical scale signal and means for processing said cyclical scale signal and said monitoring signal to establish at least one of the position and size of said object.

14. Light curtain apparatus in accordance with claim 13 and wherein received from said scale grid is reflected from the surface thereof.

15. Light curtain apparatus in accordance with claim 14 and wherein said light received from said scale grid is returned to said optical scanning means via said concave mirror and is passed from said optical scanning means to said bar pattern and said second photoelectric receiver.

16. Light curtain apparatus in accordance with claim 13 and wherein said optical scanning means comprises a rotatable mirror wheel.

* * * * *